USOO5461555A

United States Patent [19]
Kitajima et al.

[11] Patent Number: 5,461,555
[45] Date of Patent: Oct. 24, 1995

[54] FLYBACK CONVERTER HAVING A HIGH EFFICIENCY IRRESPECTIVE OF MAGNITUDE OF A LOAD

[75] Inventors: Tokimune Kitajima; Tadasi Kobayasi, both of Tokyo, Japan

[73] Assignee: NEC Corporation, Japan

[21] Appl. No.: 814,117

[22] Filed: Dec. 26, 1991

[30] Foreign Application Priority Data

Dec. 27, 1990  [JP]  Japan .................................... 2-415043

[51] Int. Cl.$^6$ ................................................ H02M 3/335
[52] U.S. Cl. .................................... 363/21; 336/165
[58] Field of Search ............................ 363/21; 323/250, 323/331, 362; 336/160, 165, 178, 214, 215; 358/190; 315/411; 348/730

[56] References Cited

U.S. PATENT DOCUMENTS

3,546,571  12/1970  Fletcher et al. .
4,459,651  7/1984  Fenter ........................................ 363/21

Primary Examiner—Kristine L. Kincaid
Assistant Examiner—Nicholas Ponomarenko
Attorney, Agent, or Firm—Ostrolenk, Faber, Gerb & Soffen

[57] ABSTRACT

In a converter which is usable as a kind of DC—DC converter and which comprises a transformer for processing an exciting current into an excited current under influence of an inductance value of the transformer, the inductance value is controlled in compliance with a value of the exciting current. The exciting current is controlled by a current control circuit with reference to the excited current so that exciting current is intermittently supplied to the transformer. While the exciting current is absent during intermittent supply to the transformer, the transformer produces the excited current.

7 Claims, 7 Drawing Sheets

FLYBACK CONVERTER HAVING A HIGH EFFICIENCY IRRESPECTIVE OF MAGNITUDE OF A LOAD

BACKGROUND OF THE INVENTION

This invention relates to a flyback converter which is usable as a kind of DC—DC converters.

Such a flyback converter comprises a flyback transformer and a current control circuit which will presently be described. The flyback transformer has an inductance value and processes an exciting current into an excited current under influence of the inductance value. The inductance value is constant while the flyback converter carries out a predetermined operation. Depending on the circumstances, the inductance value will be called a general inductance value.

The current control circuit is connected to the flyback transformer and controls the exciting current with reference to the excited current so that the exciting current is intermittently supplied to the flyback transformer. As a result, the exciting current is supplied to the flyback transformer as a succession of pulses. Each of the pulses has a pulse width corresponding to a time interval which will hereafter be called an on-period. The flyback transformer produces the excited current when the exciting current is absent.

In the manner known in the art, the on-period varies in response to magnitude of a load which is driven by the flyback converter. For example, the on-period is long when the load is relatively large. The on-period is short when the load is relatively small.

The on-period has a minimum value determined in accordance with a peripheral circuit which is related to the flyback converter. This means that it is impossible in the flyback converter to carry out the predetermined operation in a particular case where the load is very small.

In order to enable the predetermined operation in this particular case, a dummy resistor is added to the flyback converter in parallel with the load. However, the dummy resistor results in the predetermined operation at a reduced efficiency.

SUMMARY OF THE INVENTION

It is therefore an object of this invention to provide a flyback converter which has a high efficiency of operation irrespective of magnitude of a load.

Other objects of this invention will become clear as the description proceeds.

According to this invention, there is provided a flyback converter comprising a transformer having a general inductance value for processing an exciting current into an excited current under influence of the general inductance value, current control means connected to the transformer for controlling the exciting current with reference to the excited current so that the exciting current is intermittently supplied to the transformer, the transformer producing the excited current when the exciting current is absent, and inductance control means coupled to the transformer for controlling the general inductance value in compliance with a value of the exciting current.

DESCRIPTION OF THE PREFERRED EMBODIMENTS

Figure 1:
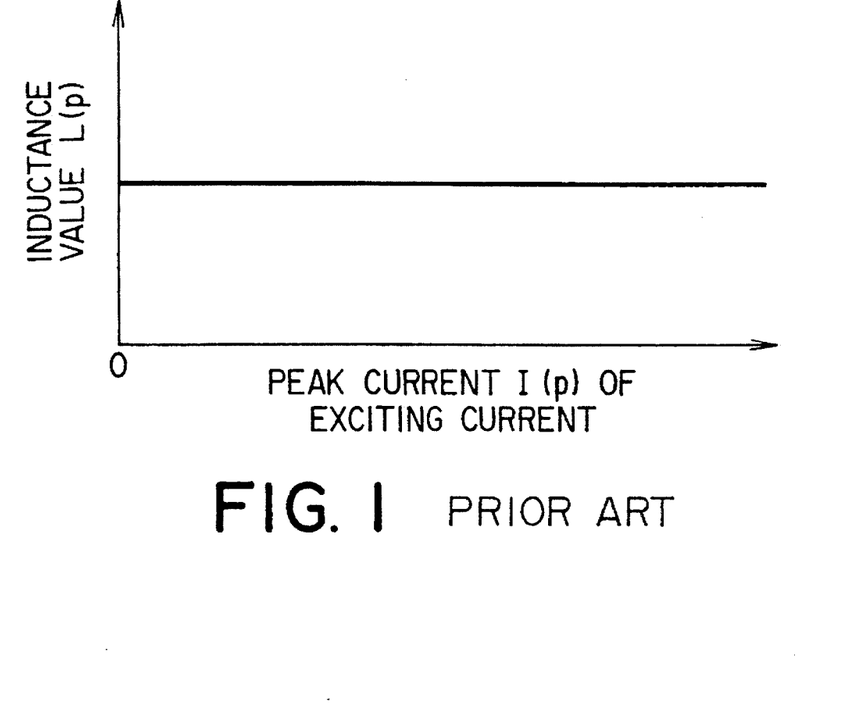
FIG. 1 is a graphic chart representative of a current-inductance relation in a conventional flyback transformer.
Figure 2:
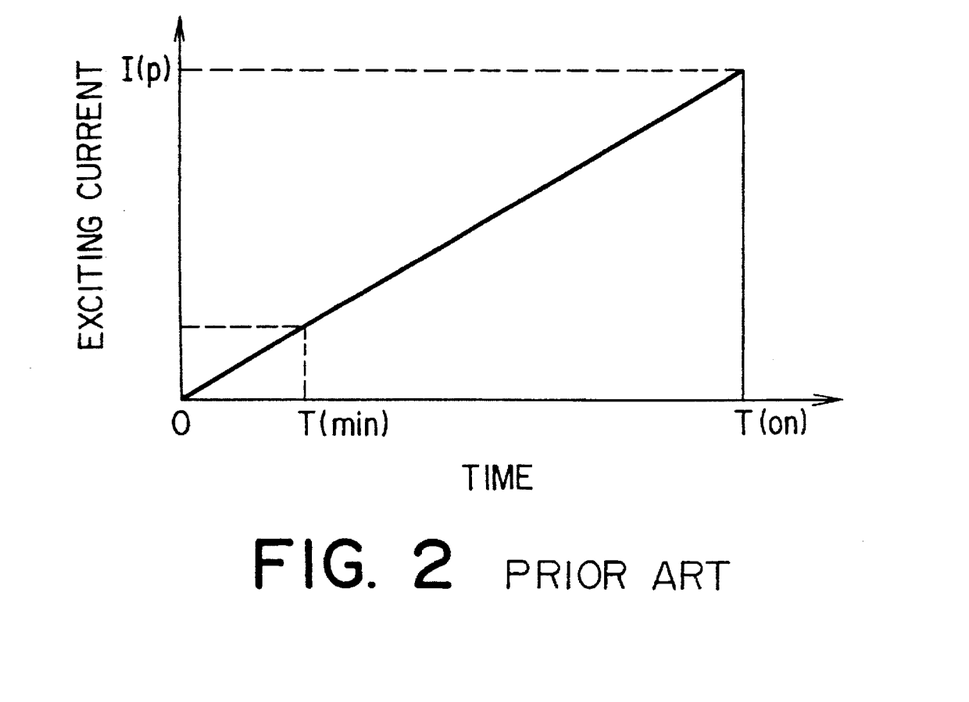
FIG. 2 is a time chart for use in describing operation of the conventional flyback transformer mentioned in connection with FIG. 1.

Referring to FIGS. 1 and 2, a conventional flyback converter will first be described for a better understanding of this invention. The conventional flyback converter comprises a flyback transformer and a current control circuit which are well known in the art. The flyback transformer has an inductance value and processes an exciting current into an excited current under influence of the inductance value. The exciting current is supplied to the flyback transformer as a succession of pulses. Each of the pulses varies during the on-period mentioned heretobefore and has a peak current.

The flyback transformer has a current-inductance relation illustrated in FIG. 1. As will be clear from FIG. 1, the inductance value $L(p)$ is constant irrespective of magnitude of the peak current $I(p)$ while the flyback converter carries out a predetermined operation.

In FIG. 2, the exciting current increases with a conventional increasing ratio in proportion to a lapse of time from time 0 to an end of the on-period $T(on)$. The on-period has a minimum value $T(min)$ determined in accordance with a peripheral circuit which is related to the flyback converter. In consideration of the minimum value $T(min)$, a dummy resistor is added to the flyback converter in parallel to a load which is driven by the flyback converter. Therefore, it is possible in the flyback converter to carry out the predetermined operation even in a case where the load is very small.

However, the dummy resistor results in the predetermined operation at a reduced efficiency.

Figure 3:
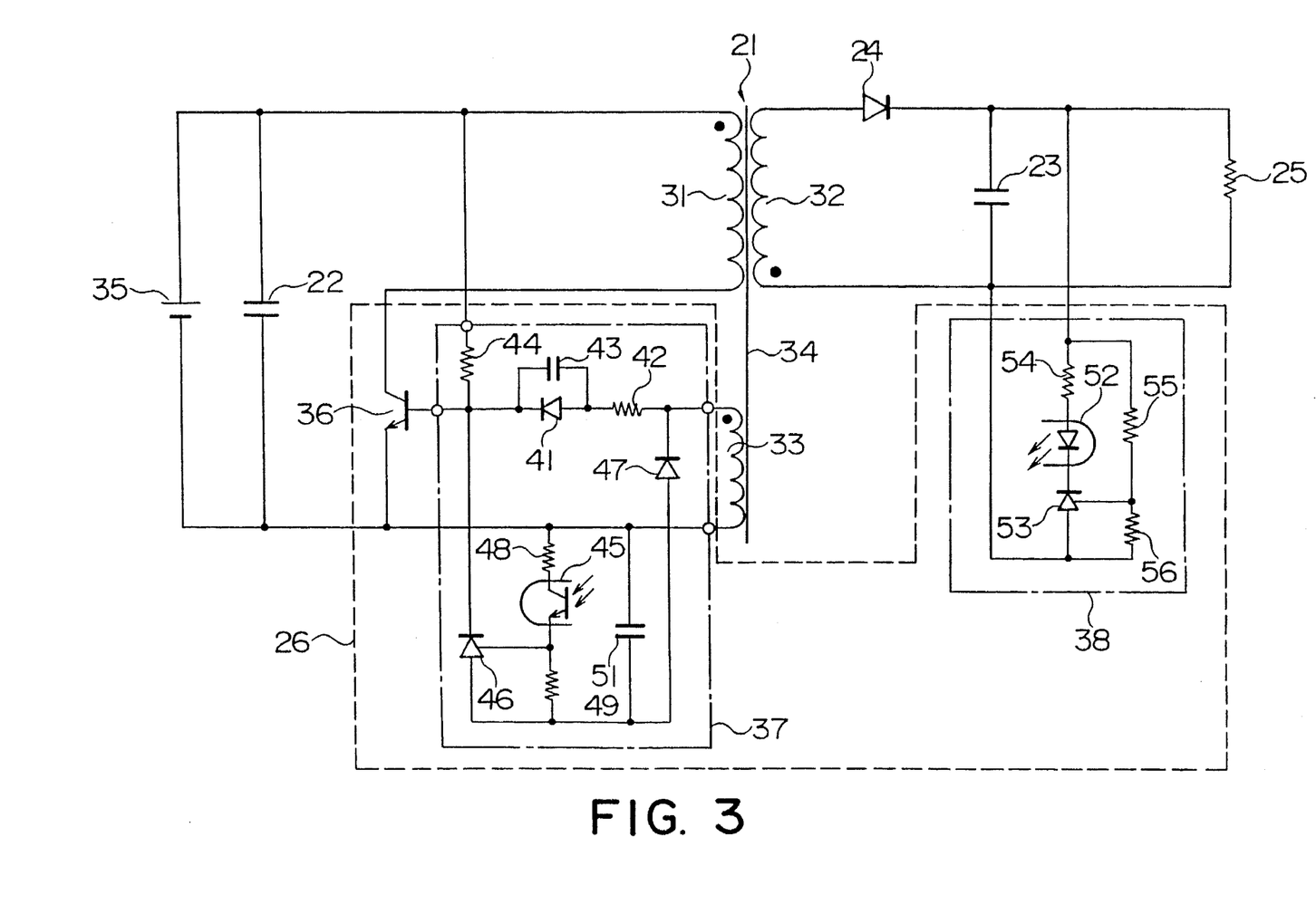
FIG. 3 is a circuit diagram of a flyback converter according to a first embodiment of this invention.

Referring to FIG. 3, the description will be directed to a flyback converter according to a first embodiment of this invention. The flyback converter comprises a flyback transformer 21, an input capacitor 22, an output capacitor 23, a smoothing-circuit diode 24, a dummy resistor 25, and a current control circuit 26 which will presently be described.

The flyback transformer 21 has an inductance value and processes an exciting current into an excited current under influence of the inductance value in the manner known in the art. Merely for convenience of the description which follows, the inductance value is herein called a general inductance value. The flyback transformer 21 comprises a primary winding 31, a secondary winding 32, an additional winding 33, and a magnetic core assembly 34 which will shortly be described. The primary winding 31 is intermittently supplied with the exciting current and produces a magnetic flux in compliance with the exciting current. The secondary winding 32 produces a flyback voltage in accordance with the magnetic flux when the exciting current is absent. Dependent on the flyback voltage, the secondary winding 32 produces the excited current. In addition, the additional winding 33 produces a drive current dependent on the magnetic flux as will later be described. The magnetic core assembly 34 couples the primary, the secondary, and the additional windings 31, 32, and 33 together and serves to guide the magnetic flux. The magnetic core assembly 34 will be referred to a flux-guiding arrangement.

The primary winding 31 is connected to a direct voltage source 35 through the current control circuit 26. The direct voltage source 35 is for generating an input direct voltage. The input capacitor 22 is connected to the direct voltage source 35 in parallel to the primary winding 31 and is for storing the input direct voltage. Dependent on the input direct voltage, the exciting current is intermittently supplied to the primary winding 31 under control of the current control circuit 26 in the manner known in the art.

The output capacitor 23 is connected to the secondary winding 32 through the smoothing-circuit diode 24. A combination of the output capacitor 23 and the smoothing-circuit diode 24 serves as a smoothing circuit for smoothing the excited current to produce an output direct voltage.

The dummy resistor 25 is connected to the secondary winding 32 in parallel to the output capacitor 23. Although not shown in the figure, a load is connected to the secondary winding 32 in parallel to the dummy resistor 25.

The description will proceed to the current control circuit 26. The current control circuit 26 comprises a main transistor 36, a drive circuit 37, and a feedback control circuit 38, all of which will presently be described. In the manner known in the art, the main transistor 36 has a collector, an emitter, and a base terminal. The collector terminal is connected to a positive electrode of the direct voltage source 35 through the primary winding 31. The emitter terminal is connected directly to a negative electrode of the direct voltage source 35. The base terminal is connected to the drive circuit 37 as will become clear from the following description.

The drive circuit 37 comprises a blocking diode 41 which is connected to the base terminal of the main transistor 36 and to the additional winding 33 through a resistor 42. A capacitor 43 is connected parallel to the preventing diode 41. A drive resistor 44 is connected to the positive electrode of the direct voltage source 35 and to the base terminal of the main transistor 36.

The drive circuit 37 further comprises a phototransistor 45 and a first shunt regulator 46. The phototransistor 45 is connected parallel to the additional winding 33 through a connecting diode 47, a collector resistor 48, and an emitter resistor 49. The first shunt regulator 46 is connected to the base terminal of the main transistor 36 and to each end of the emitter resistor 49. A capacitor 51 is connected parallel to a first series circuit which comprises the phototransistor 45, the collector resistor 48, and the emitter resistor 49.

The feedback control circuit 38 comprises a light emitting diode 52 connected parallel to the dummy resistor 25 through a second shunt regulator 53 and an anode resistor 54. Two dividing resistors 55 and 56 are connected in series and connected parallel to a second series circuit which comprises the light emitting diode 52, the second shunt regulator 53, and the anode resistor 54. The second shunt regulator 53 is further connected to a point of connection between the dividing resistors 55 and 56. It is to be noted that the light emitting diode 52 is optically coupled to the phototransistor 45.

In order to start the flyback converter, the main transistor 36 is temporarily turned on in response to a base bias current which is supplied to the base terminal of the main transistor 36 through the drive resistor 44. When the transistor 36 is turned on, the primary winding 31 is supplied with the exciting current in dependence on the input direct voltage. As a result, an induced voltage is produced in the additional winding 33. Responsive to the induced voltage, the drive current is supplied as a base current to the base of the main transistor 36. Accordingly, the main transistor 36 is turned on without fail during the before-mentioned on-period. During the on-period, the main transistor 36 has a peak current I(p) which is given by:

$$I(p)=ET(on)/L(p), \tag{1}$$

where E represents an input direct voltage, T(on) representing the on-period, L(p) representing the general inductance value.

During the on-period, the flyback converter produces an electrical output power P(o) which is given by:

$$P(o)=L(p)I(p)^2/4T(on). \tag{2}$$

In Equation (2), the electrical output power P(o) is in proportion to the square of the peak current I(p). Accordingly, it is possible to control the output direct voltage by varying the peak current I(p).

The description will be directed to control of the output direct voltage. The output direct voltage is divided by the dividing resistors 55 and 56 and is supplied to a base terminal of the second shunt regulator 53. When the output direct voltage rises in response to change of magnitude of at least one of the input direct voltage and the load, the light emitting diode 52 is provided with a diode current which increases dependent on operation of the shunt regulator 53. As a result, the light emitting diode 52 emits light of a predetermined intensity in response to the diode current.

Responsive to the light of the predetermined intensity, the phototransistor 45 is turned on to provide the first shunt regulator 46 with a reduced anode voltage. When the anode voltage is lowered, the main transistor 36 has a base current which is decreased. As a result, the peak current decreases. Therefore, the output direct voltage is lowered.

When the output direct voltage is lowered, the control of the output direct voltage is carried out as follows. When the main transistor 36 is turned on, the flyback voltage is blocked by the smoothing-circuit diode 24. Therefore, the flyback voltage is not supplied to the output capacitor 23. When the exciting current becomes equal to the peak current, the main transistor 36 is turned off. At this moment, the flyback voltage is supplied to the output capacitor 23.

Figure 4:
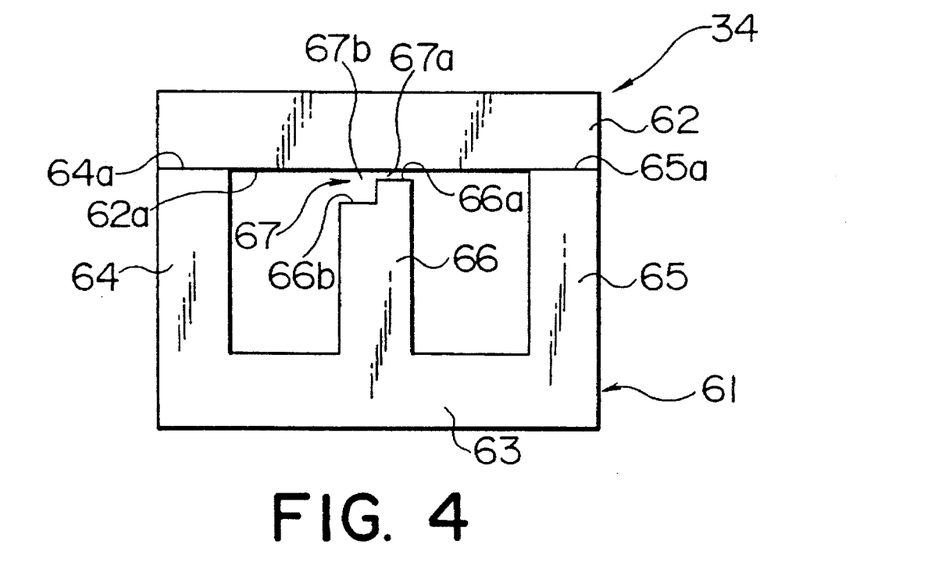
FIG. 4 is a front view of a magnetic core assembly included in the flyback converter illustrated in FIG. 3.
Figure 5:
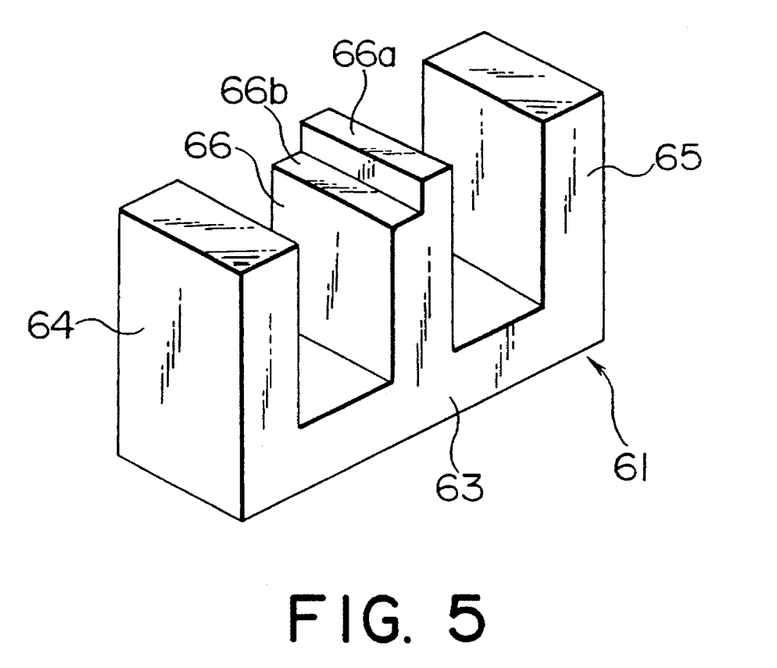
FIG. 5 is a perspective view of the magnetic core of the magnetic core assembly illustrated in FIG. 4.

Referring to FIGS. 4 and 5, the magnetic core assembly 34 will be described in detail. The magnetic core assembly 34 comprises first and second core members 61 and 62 which are connected to each other. The first core member 61 is generally called an E-shape core and has a base portion 63, two side leg portions 64 and 65, and a central leg portion 66. The side leg portions 64 and 65 extend from the base portion 63 with a space left therebetween and have side leg end surfaces 64*a* and 65*a*. The central leg portion 66 extends from the base portion 63 between the side leg portions 64 and 65 and has first and second central leg end surfaces 66*a* and 66*b* which are more clearly illustrated in FIG. 5.

The second core member 62 is generally called an I-shape core and is square in cross-section. The second core member 62 has a side or a core end surface 62*a* which is in contact with the side leg end surfaces 64*a* and 65*a* with a gap 67 left between the core end surface 62*a* and each of the first and the second central leg end surfaces 66*a* and 66*b*.

When the flyback converter carries out the predetermined operation, the above-mentioned magnetic flux flows through the magnetic core assembly 34 and the gap 67 in a predetermined direction. In this event, the gap 67 is operable as an inductance control arrangement for controlling the general inductance value in compliance with a value of the exciting current in the manner which will later be described in detail.

The gap 67 comprises first and second gap portions 67*a* and 67*b*. The first gap portion 67*a* is between the core end surface 62*a* and the first central leg end surface 66*a* and has a first size in the predetermined direction. The second gap portion 67*b* is between the core end surface 62*a* and the second central leg end surface 66*b* and has a second size in the predetermined direction. The second size is greater than the first size.

Figure 6:
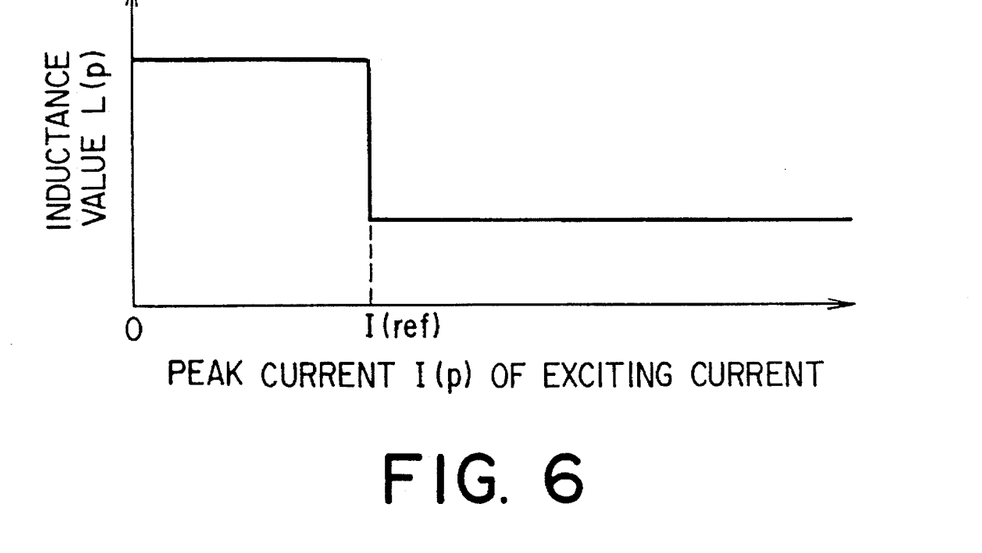
FIG. 6 is a graphic chart representative of a current-inductance relation in a flyback transformer of the flyback converter illustrated in FIG. 3.

Referring to FIG. 6 together with FIG. 4, the description will be directed to a current-inductance relation of the flyback transformer comprising the magnetic core assembly 34. The gap 67 controls the magnetic flux with reference to a flux density, namely, in compliance with the flux density. The magnetic flux is determined in accordance with the exciting current. As a result, the inductance value L(p) rapidly varies in response to magnitude of the peak current I(p). When the peak current I(p) is less than a reference current I(ref), the inductance value L(p) has a first inductance value. In this event, the gap 67 will be referred to as a first producing arrangement. When the peak current I(p) is greater than the reference current I(ref), the inductance value L(p) has a second inductance value which is less than the first inductance value. In this latter case, the gap 67 will be referred to as a second producing arrangement.

Figure 7:
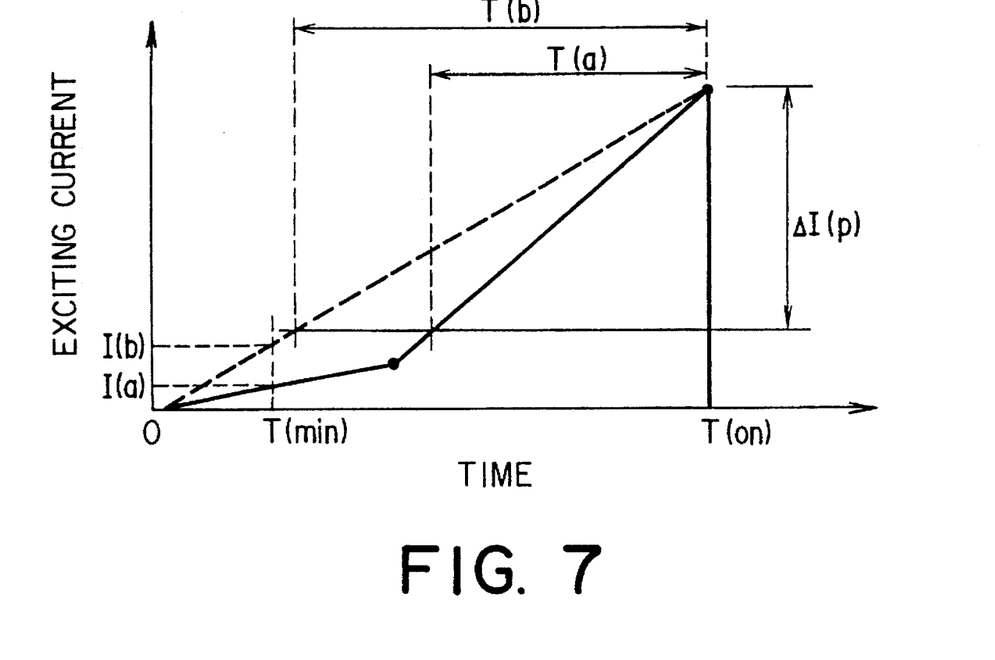
FIG. 7 is a time chart for use in describing operation of the flyback transformer of the flyback converter illustrated in FIG. 3.

Referring to FIG. 7, the description will be made as regards operation of the flyback transformer. When the inductance value L(p) has the first inductance value, the exciting current increases in proportion to a lapse of time with a particular increasing ratio which is less than the above-mentioned conventional increasing ratio. When the inductance value L(p) has the second inductance value, the exciting current increases in proportion to the lapse of the time with a specific increasing ratio which is greater than the conventional increasing ratio.

It will be assumed that the load has a magnitude which is variable within a predetermined current width ΔI(p). Responsive to the magnitude of the load variable within the predetermined current width ΔI(p), the on-period varies within a predetermined time interval. In this event, the predetermined time interval T(a) of the flyback transformer illustrated is shorter than that T(b) of a conventional flyback transformer. Accordingly, it is readily possible to control the output direct voltage in response to the magnitude of the load.

In addition, it is possible to reduce a dummy current determined by the dummy resistor 25 of FIG. 3. Namely, the dummy current I(a) of the flyback transformer illustrated is less than the current I(b) of the conventional flyback transformer. Accordingly, it is possible to make the flyback converter have a high efficiency of the predetermined operation irrespective of the magnitude of the load.

Figure 8:
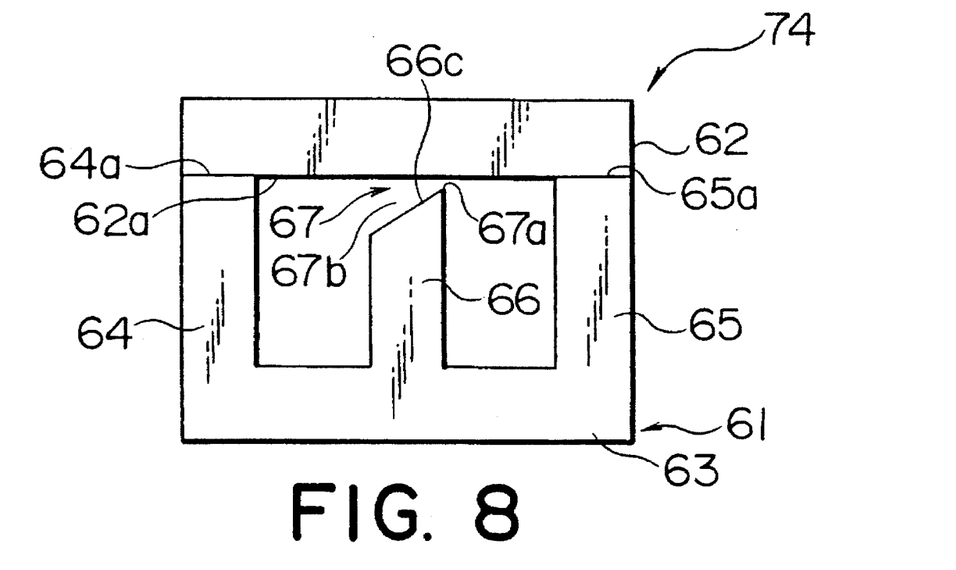
FIG. 8 is a front view of a magnetic core assembly included in a flyback transformer of a flyback converter according to a second embodiment of this invention.
Figure 9:
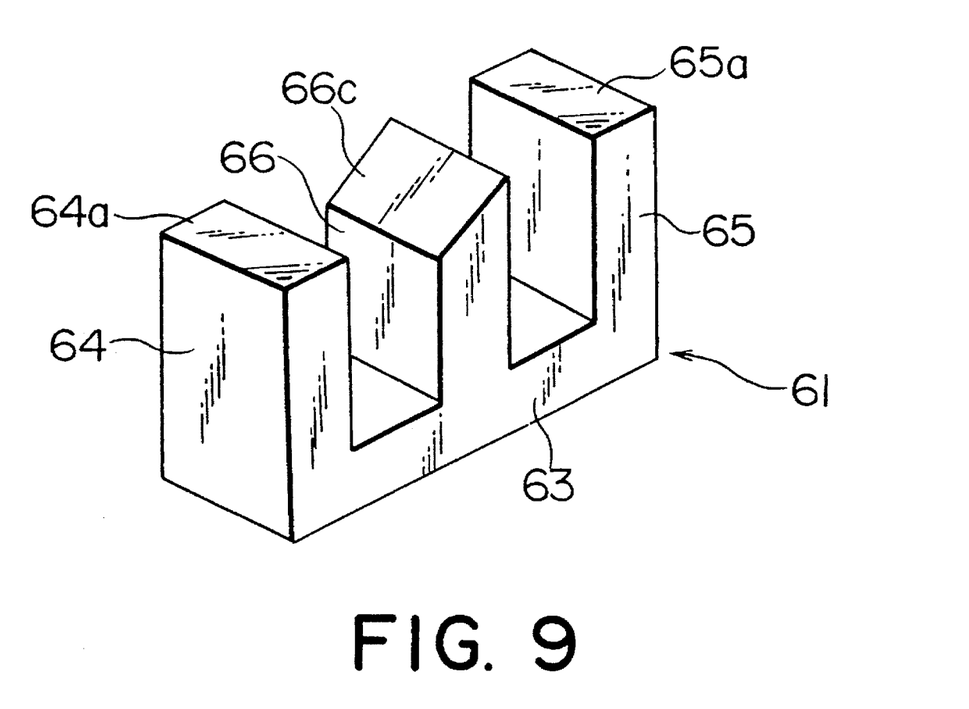
FIG. 9 is a perspective view of a magnetic core of the magnetic core assembly illustrated in FIG. 8.

Referring to FIGS. 8 and 9, the description will be directed to a flyback converter according to a second embodiment of this invention. The flyback converter comprises a magnetic core assembly 74 instead of the magnetic core assembly 34 illustrated with reference to FIGS. 4 and 5. the magnetic core assembly 74 comprises similar parts designated by like reference numerals.

In the first core member 61, the side leg end surfaces 64*a* and 65*a* are on a first plane. The central leg portion 66 has a slant end surface 66*c* on a second plane which is slanted relative to the first plane. The core end surface 62*a* is in contact with the side leg end surfaces 64*a* and 65*a*. A gap 67 of a wedge shape is left between the core end surface 62*a* and the slant end surface 66*c*. As a result, the gap 67 comprises first and second gap portions 67*a* and 67*b* having the first and the second sizes, respectively, in the predetermined direction. The second size is greater than the first size.

When the flyback converter carries out the predetermined operation, the magnetic flux flows through the magnetic core assembly 74 and the gap 67 in the predetermined direction. In this event, the gap 67 is operable as the inductance control arrangement.

Figure 10:
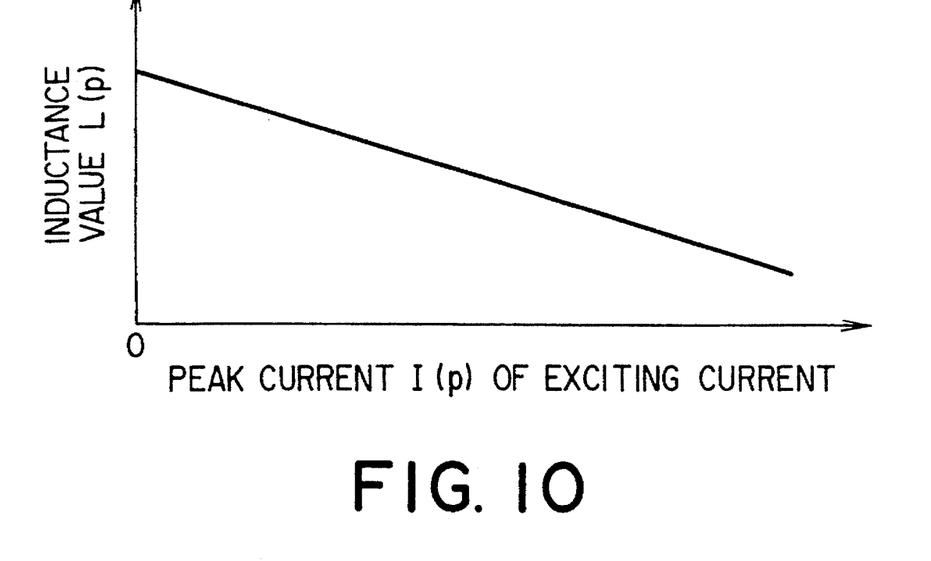
FIG. 10 is a graphic chart representative of a current-inductance relation in a flyback transformer of the magnetic core assembly illustrated in FIG. 8.

Referring to FIG. 10 together with FIG. 8, the description will be directed to a current-inductance relation of the flyback transformer comprising the magnetic core assembly 74. The gap 67 controls the magnetic flux with reference to the flux density. As a result, the inductance value L(p) gradually varies with the magnitude of the peak current I(p). In particular, the inductance value L(p) decreases in proportion to an increase of the peak current I(p). When the peak current I(p) is relatively small, the gap 67 serves as the first producing arrangement. When the peak current I(p) is relatively great, the gap 67 will be referred to as the second producing arrangement.

Figure 11:
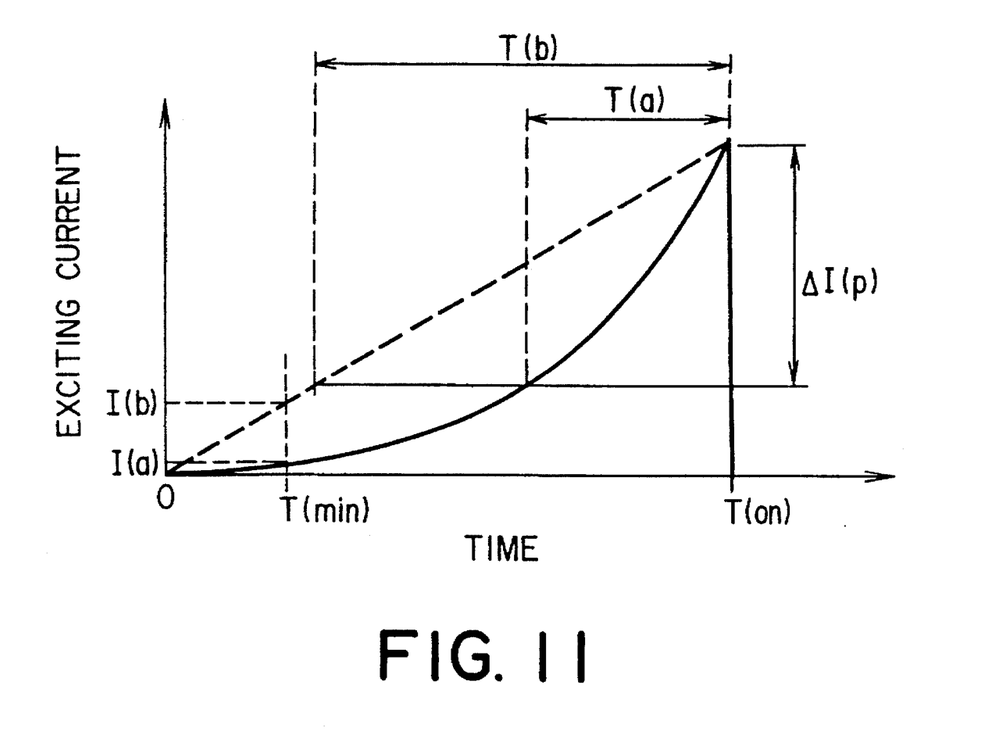
FIG. 11 is a time chart for use in describing operation of the flyback converter mentioned in connection with FIG. 8

Referring to FIG. 11, the description will be made as regards operation of the flyback transformer comprising the magnetic core assembly 74. The exciting current exponentially increases with a lapse of time from time 0 to an end of the on-period T(on).

Responsive to the magnitude of the load variable within the predetermined current width ΔI(p), the on-period varies within the predetermined time interval. In this event, the predetermined time interval T(a) of the flyback transformer illustrated is shorter than the interval T(b) of the conventional flyback transformer. Accordingly, it is readily possible to control the output direct voltage in response to the magnitude of the load.

In addition, it is possible to reduce the dummy current. Namely, the dummy current I(a) of the flyback transformer illustrated is less than that I(b) of a conventional flyback transformer. Accordingly, it is possible to make the flyback converter have a high efficiency of the predetermined operation irrespective of the magnitude of the load.

Figure 12:
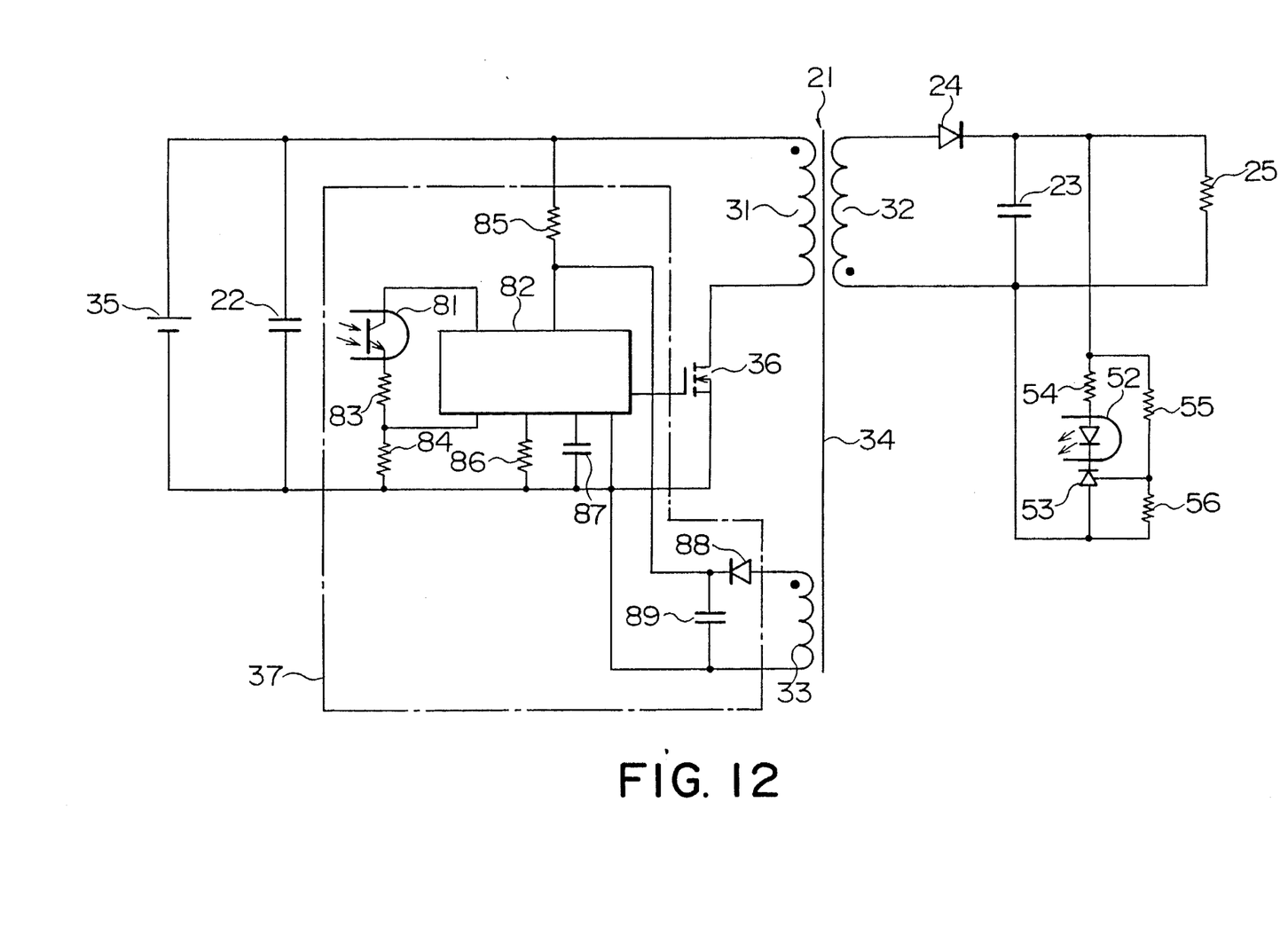
FIG. 12 is a circuit diagram of a modification of the flyback converter illustrated in FIG. 3.

Referring to FIG. 12, the description will proceed to a modification of the flyback converter illustrated in FIG. 3. The illustrated flyback converter comprises similar parts designated by like reference numerals.

The drive circuit 37 comprises a phototransistor 81 and a central control unit 82, which is typically a microprocessor NEC μPC 1099 manufactured and sold by NEC Corporation, Tokyo, Japan. The phototransistor 81 has collector and emitter terminals which are connected through a first driving resistor 83 across the central control unit 82 and through a second dividing resistor 84 to the negative electrode of the direct voltage source 35. The central control unit 82 is connected to the positive electrode of the direct voltage source 35 through a main driving resistor 85, to the negative electrode of the direct voltage source 35 through a determining resistor 86, to the base terminal of the main transistor 36 through a direct connection 86', to a point of connection between the first and the second dividing resistors 83 and 84, and to the additional winding 33. A determining capacitor 87 is connected to the central control unit 82 and to the negative electrode of the direct voltage source 35. It is to be noted that the phototransistor 81 is optically coupled to the light emitting diode 45.

The drive circuit 37 further comprises an additional smoothing-circuit diode 88 and a smoothing-circuit capacitor 89. The additional smoothing-circuit diode 88 is connected to the additional winding 33 and to a point of connection between the central control unit 82 and the main driving resistor 85. The smoothing-circuit capacitor 89 is connected to the additional winding 33 through the additional smoothing-circuit diode 88. A combination of the additional smoothing-circuit diode 88 and the smoothing-circuit capacitor 89 serves as an additional smoothing-circuit for smoothing the drive current.

When supplied with a start current of the exciting current through the main driving resistor 85, the central control unit 82 supplies a drive signal to the base terminal of the main transistor 36. Responsive to the drive signal, the main transistor 36 temporarily starts a predetermined switching operation. At this moment, the primary winding 31 is supplied with the exciting current in dependence on the input direct voltage. Responsive to the exciting current, an induced voltage is produced in the additional winding 33. Responsive to the induced voltage, the drive current is supplied to the central control unit 82. As a result, the central control unit 82 controls the main transistor 36 to continuously carry out the predetermined switching operation. A combination of the determining resistor 86 and the determining capacitor 87 serves as a determining circuit for determining a rate of the predetermined switching operation.

While the present invention has thus far been described in connection with only one preferred embodiment thereof, it will now be readily possible for those skilled in the art to put this invention into practice in various other manners. For example, the magnetic core assembly may be a combination of two core members each of which is generally called an E-shape core. The magnetic core assembly may comprise a part which has current-inductance relation of a non-linear characteristic and which serves as the inductance control arrangement.

What is claimed is:

1. A flyback converter comprising:

a transformer having a general inductance value for processing an exciting current into an excited current, said transformer comprising a primary winding supplied with said exciting current for producing a magnetic flux in compliance with said exciting current, a magnetic core assembly coupled to said primary winding for guiding said magnetic flux under influence of said general inductance value, a secondary winding coupled to said magnetic core assembly for producing a flyback voltage in accordance with said magnetic flux when said exciting current is absent, said secondary winding producing a current in response to said flyback voltage, and an additional winding coupled to said magnetic core assembly for producing a drive current dependent on said magnetic flux;

current control means connected to said primary and said additional windings for controlling said exciting current in accordance with said drive current so that said exciting current is intermittently supplied to said primary winding; and inductance control means coupled to said magnetic core assembly for controlling the magnitude of said general inductance value in dependence on a value of said exciting current.

2. A flyback converter as claimed in claim 1, wherein said exciting current has a first and a second current value, said second current value being greater than said first current value, and wherein said inductance control means comprises:

first producing means coupled to said transformer for producing a first inductance value as said general inductance value when said exciting current has said first current value; and second producing means coupled to said transformer and said first producing means for producing a second inductance value as said general inductance value when said exciting current has said second current value, said second inductance value being less than said first inductance value.

3. A flyback converter as claimed in claim 1, said transformer comprising said winding for producing a magnetic flux in dependence on said exciting current, said secondary winding for producing said excited current in accordance with said magnetic flux, and flux-guiding means between said primary and said secondary windings for guiding said magnetic flux, said magnetic flux having a flux density which is determined in accordance with said exciting current, wherein said inductance control means is coupled to said flux-guiding means to control said magnetic flux with reference to said flux density.

4. A flyback converter as claimed in claim 3, said flux-guiding means having first and second end surfaces which are opposite to each other with a gap left therebetween in a predetermined direction which is determined by a flow of said magnetic flux, wherein said gap is operable as said inductance control means and comprises:

a first gap portion having a first size in said predetermined direction; and a second gap portion having a second size in said predetermined direction, said second size being greater than said first size.

5. A flyback converter as claimed in claim 3, wherein said inductance control means comprises a magnetic material connected to said flux-guiding means and having a current-inductance relationship comprising a non-linear characteristic.

6. A flyback converter comprising:

a primary winding supplied with an exciting current for producing a magnetic flux in compliance with said exciting current;

a magnetic core assembly coupled to said primary winding for guiding said magnetic flux;

a secondary winding coupled to said magnetic core assembly for producing a flyback voltage in accordance with said magnetic flux when said exciting current is absent, said secondary winding producing an excited current in response to said flyback voltage;

an additional winding coupled to said magnetic core assembly for producing a drive current dependent on said magnetic flux; and control means connected to said primary and said additional windings for controlling said exciting current in accordance with said drive current so that said exciting current is intermittently supplied to said primary winding, said magnetic core having surfaces opposite to each other with a gap therebetween in a predetermined direction which is determined by a flow of said magnetic flux, one of said opposite surfaces extending along a flat surface perpendicular to said predetermined direction, another one of said opposite surfaces having a first and a second end surface which are disposed at different levels with respect to each other in said predetermined direction so as to form a step therebetween.

7. A flyback converter comprising:

a primary winding supplied with an exciting current for producing a magnetic flux in compliance with said exciting current;

a magnetic core assembly coupled to said primary winding for guiding said magnetic flux;

a secondary winding coupled to said magnetic core assembly for producing a flyback voltage in accordance with said magnetic flux when said exciting current is absent, said secondary winding producing an excited current in response to said flyback voltage;

an additional winding coupled to said magnetic core assembly for producing a drive current dependent on said magnetic flux; and control means connected to said primary and said additional windings for controlling said exciting current in accordance with said drive current so that said exciting current is intermittently supplied to said primary winding, said magnetic core having surfaces opposite to each other with a gap therebetween in a predetermined direction which is determined by a flow of said magnetic flux, one of said opposite surfaces extending along a flat surface perpendicular to said predetermined direction, another one of said opposite surfaces an end surface which is slanted relative to said flat surface.

* * * * *